US007221065B2

(12) United States Patent
Amagasa et al.

(10) Patent No.: US 7,221,065 B2
(45) Date of Patent: May 22, 2007

(54) POWER WINDOW SYSTEM FOR VEHICLE

(75) Inventors: Yoshinori Amagasa, Tokyo (JP); Tatsuya Michishige, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 287 days.

(21) Appl. No.: 10/965,084

(22) Filed: Oct. 14, 2004

(65) Prior Publication Data

US 2005/0082991 A1 Apr. 21, 2005

(30) Foreign Application Priority Data

Oct. 15, 2003 (JP) ............................ 2003-355029

(51) Int. Cl.
*B60R 25/04* (2006.01)
*B60R 25/10* (2006.01)
*B60R 22/00* (2006.01)
*H04B 7/00* (2006.01)

(52) U.S. Cl. ............... 307/10.3; 455/41.2; 340/426.28; 340/5.72; 701/49

(58) Field of Classification Search ............... 455/41.2; 340/5.72, 426.28; 701/45, 49
See application file for complete search history.

(56) References Cited

U.S. PATENT DOCUMENTS 4,873,530 A 10/1989 Takeuchi et al.
5,747,956 A 5/1998 Lamm
6,944,528 B2 * 9/2005 Nagano ........................ 701/49
2002/0161501 A1 * 10/2002 Dulin et al. .................. 701/45
2004/0075532 A1 * 4/2004 Ueda et al. ................ 340/5.72
2005/0020212 A1 * 1/2005 Hiramitsu et al. ......... 455/41.2

FOREIGN PATENT DOCUMENTS

DE 43 08 912 A1 9/1994
DE 101 62 209 A1 7/2003
EP 1 099 812 A2 5/2001
EP 1 394 751 A2 3/2004
JP 64-43037 A 2/1989
JP 2001-234653 A 8/2001

* cited by examiner

*Primary Examiner*—Stephen W. Jackson
*Assistant Examiner*—Tien Mai
(74) *Attorney, Agent, or Firm*—Darby & Darby

(57) ABSTRACT

A power window system includes an occupant existence determination unit and a power supply unit. The occupant existence determination unit determines whether an occupant is in the compartment or outside the passenger compartment, by receiving a signal from a portable device held by the occupant. The power supply unit supplies a power to a window driving unit when the occupant existence determination unit determines that the occupant is in the compartment and when the vehicle ignition key is in an OFF state.

9 Claims, 6 Drawing Sheets

POWER WINDOW SYSTEM FOR VEHICLE

This application claims foreign priority based on Japanese patent application No. JP-2003-355029, filed on Oct. 15, 2003, the contents of which is incorporated herein by reference.

BACKGROUND OF THE INVENTION

The present invention relates to a power window system for electrically opening and closing a window of a vehicle through an operation by an occupant of the vehicle.

The vehicle such as an automobile generally has the power window system for electrically opening and closing a window of the vehicle (for example, JP-A-2001-234653). The vehicular power window system includes an operation switch installed on a trim on a passenger compartment side of the vehicle, a window main body adapted to be raised and lowered so as to close and open an opening in a door, and a window driving unit for electrically driving the main body in accordance with the operation of the operation switch. The driving unit has arms that are connected to the main body and driven by an electric motor when the motor is driven, whereby the main body is raised and lowered by moving the arms. The electric motor in the driving unit is designed to be energized when an ignition key is in an ON state and not to be energized when the ignition key is in an OFF state.

According to the power window system, in the event that no occupant is determined to sit in the passenger compartment, the raising and lowering speed thereof is designed to be faster than that when the occupant sits in the passenger compartment. A detection of an existence of the occupant within the passenger compartment is carried out by a portable device of a keyless entry system for operating the doors and an occupant sensor installed in a seat.

In addition, as another type of the power window system, there is known the power window system in which a window operating portion continues to be energized until the door to the driver's seat is opened and closed when the ignition key is switched from the ON state to the OFF state. According to the power window system, the window operation continues to be available until the occupant gets out of the driver's seat even when the ignition key is in the OFF state.

In the power window system in which the energization is controlled until the door to the driver's seat is opened and closed, when the ignition key is in the OFF state, however, in the event that the occupant gets out of the vehicle from a front-seat passenger side of the vehicle by utilizing a so-called walk-through function, the window driving unit still remains energized. Therefore, when the energization continues for a long time, there causes a risk that the battery is exhausted. Moreover, according to the above power window system, in the event that a robber inserts a stick or the like in an opened space to operate the switch with the stick, there causes a risk that the window main body can be lowered.

SUMMARY OF THE INVENTION

The present invention was made in the light of the situations, and an object thereof is to provide a power window system for permitting an energization of a window driving unit only when an existence of an occupant in a passenger compartment is ensured.

With a view to attaining the object, according to a first aspect of the present invention, there is provided a power window system for a power to be supplied to a window driving unit so as to permit a window operation when an ignition key is turned to be in an ON state, comprising:

occupant existence recognition means (an occupant existence determination unit) for determining whether or not an occupant of a vehicle is in a passenger compartment by receiving a signal from a portable device held by the occupant; and a power supply unit for supplying the power to the window driving unit when the occupant is in the passenger compartment when the ignition key is in OFF state so as to easily and exactly make certain an existence of said occupant and to economize the power.

According to the first aspect of the present invention, even when the ignition key is in the OFF state, in the event that the passenger compartment is determined to be occupied by the occupant, the power is supplied to the window driving unit by the power supply unit. Here, since the occupant existence determination unit determines whether or not the occupant is in the passenger compartment by receiving a signal from the portable device held by the occupant, the determination can be implemented accurately.

Consequently, the energization of the window driving unit can be implemented only when the existence of the occupant in the passenger compartment is accurately ensured, whereby the exhaustion of the battery can be suppressed to a minimum level.

According to a second aspect of the invention, there is provided the power window system as set forth in the first aspect of the present invention, wherein the portable device and the occupant existence determination unit are those used in a smart key system for permitting the start of an engine when the occupant is in the passenger compartment.

According to the second aspect of the present invention, in addition to the function provided by the first aspect of the present invention, the power window system can be structured without increasing the number of components by using the smart key system that is originally fixed on the vehicle as the portable device and the occupant existence determination unit.

In addition, since the engine cannot be started as long as a signal is not received from the portable device of the smart key system, the occupant is forced to hold the portable device at all times. Namely, since the power window system operates based on the signal from the portable device that is held by the occupant at all times, the determination of the existence of the occupant becomes more accurate.

According to a third aspect of the present invention, there is provided the power window system as set forth in the first aspect of the invention, wherein the portable device is such as to have a mislaid warning function to inform that the portable device is mislaid in the passenger compartment with alarm, when a predetermined mislaying condition is established, and comprising a mislaid prohibiting unit for prohibiting the supply of the power to the window driving unit after the warning function has been activated.

According to the third aspect of the present invention, in addition to the function provided by the first aspect of the invention, the power supply to the window driving unit is prohibited in the state where the occupant moves to the outside of the passenger compartment with the portable device mislaid within the passenger compartment, whereby the exhaustion of the battery power can be suppressed further.

Here, since no occupant is in the passenger compartment in the state where the occupant mislays the portable device within the passenger compartment, robbing cannot be monitored. As this occurs, in case the window driving unit is in an energized state, a robber can operate the switch to lower the window by forcing a stick from an opened space of the vehicle.

However, the aforesaid robbing can be prevented by prohibiting the power supply to the window driving unit after the warning function is activated.

According to a fourth aspect of the present invention, there is provided a power window system as set forth in any of the first to third aspects of the invention, comprising a measuring unit for measuring a total time when a window has been driven after the occupant existence determination unit has determined that the occupant was in the compartment and a time prohibiting unit for prohibiting the power supply to the window driving unit by the power supply unit in the event that the total time measured by the measuring unit exceeds a pre-set battery protection time.

According to the fourth aspect of the present invention, in addition to the function provided by any of the first to third aspects of the invention, the power supply to the window driving unit is prohibited in the event that the total time when the window is driven after the ignition key has been put in the OFF state exceeds the battery protection time, whereby a risk is eliminated that the battery is exhausted as a result of the continuation of the power supply to the window driving unit over a long time, thereby making it possible to properly protect the battery endurance.

According to a fifth aspect of the present invention, there is provided the vehicular power window system as set forth in any of the first to fourth aspects of the invention, comprising a non-in-compartment state prohibiting means for prohibiting the power supply to the window driving unit in the event that the occupant existence determination unit determines that the occupant is not in the compartment, after the power has been supplied to the window driving unit by the power supply unit.

According to the fifth aspect of the present invention, in addition to the function provided by any of the first to fourth aspect of the invention, in the event that the occupant moves to the outside of the passenger compartment, whereby it is determined that the occupant is not in the compartment with the power being supplied to the window driving unit when the ignition key is in the OFF state, the power supply to the window driving unit is prohibited, so that the exhaustion of the battery can be suppressed further.

Here, since nobody is within the passenger compartment in the non-in-compartment state, a robbery cannot be monitored. As the robbery occurs, in the event that the window driving unit is in an energized state, the robber can operate the switch to lower the window by forcing a stick from the opened space of the vehicle.

However, the robbery like this can be prevented by prohibiting the power supply to the window driving unit when the occupant moves to the outside of the passenger compartment.

According to a sixth aspect of the present invention, there is provided the power window system as set forth in the fifth aspect of the invention, wherein the non-in-compartment state prohibiting means is adapted to prohibit the power supply to the window driving unit after the time elapse of a pre-set permissible period that is set in advance since the occupant existence determination unit determines that the occupant is not in the compartment.

According to the sixth aspect of the present invention, in addition to the function provided by the fifth aspect of the invention, even when the occupant moves to the outside of the passenger compartment for a short period of time, in case the occupant returns to the passenger compartment before the pre-set permissible period has elapsed, the window operation can continue to be operated, whereby the convenience to the occupant can be enhanced further.

According to a seventh aspect of the present invention, there is provided the power window system as set forth in any of the fist to sixth aspect of the invention, comprising a signaling unit for signaling the occupant that the power is supplied to the window driving unit by the power supply unit so that the window can be operated.

According to the seventh aspect of the present invention, in addition to the function provided by any of the first to sixth aspects of the invention, the occupant can recognize through the signaling unit that the window can be operated even when the ignition key is in the OFF state.

Consequently, when he or she recognizes through the signaling unit that the window is in the state where it can be operated, the occupant can operate the window quickly without switching the ignition key from the OFF state to the ON state.

According to an eighth aspect of the present invention, there is provided the power window system as set forth in the seventh aspect of the invention, wherein the signaling means has a lamp control unit for signaling the occupant that the window can be operated by controlling a lamp disposed within the passenger compartment.

According to the eighth aspect of the present invention, in addition to the function provided by the seventh aspect of the invention, the occupant can recognize that the window can be operated by illuminating or flashing the lamp disposed within the passenger compartment.

In addition, in the event that the lamp for a key operating portion or the lamp for the window operating switch which is installed within the passenger compartment is used, the signaling unit can be structured without increasing the number of components.

According to a ninth aspect of the present invention, there is provided the power window system as set forth in the seventh or eighth aspect of the invention, wherein the signaling means has buzzer control means for signaling the occupant that the window can be operated by controlling a buzzer disposed within the passenger compartment.

According to the ninth aspect of the present invention, in addition to the function provided by the seventh or eighth aspect of the invention, the occupant can recognize that the window can be operated by activating the buzzer.

In addition, in the event that the buzzer installed in the vehicle for gear shift operation is used, the signaling unit can be structured without increasing the number of components.

Thus, according to the present invention, the energization is permitted even if the predetermined time has elapsed since the ignition key was put in the OFF state where the occupant is within the passenger compartment, and the window driving unit can be energized only when the existence of the occupant within the passenger compartment can be ensured.

BRIEF DESCRIPTION OF THE DRAWINGS

FIGS. 6A and 6B are block diagrams of the storage units, in which FIG. 6A shows the storage unit for a smart control unit, and FIG. 6B shows the storage unit for a window control unit.

DESCRIPTION OF THE PREFERRED EMBODIMENT

Figure 1:
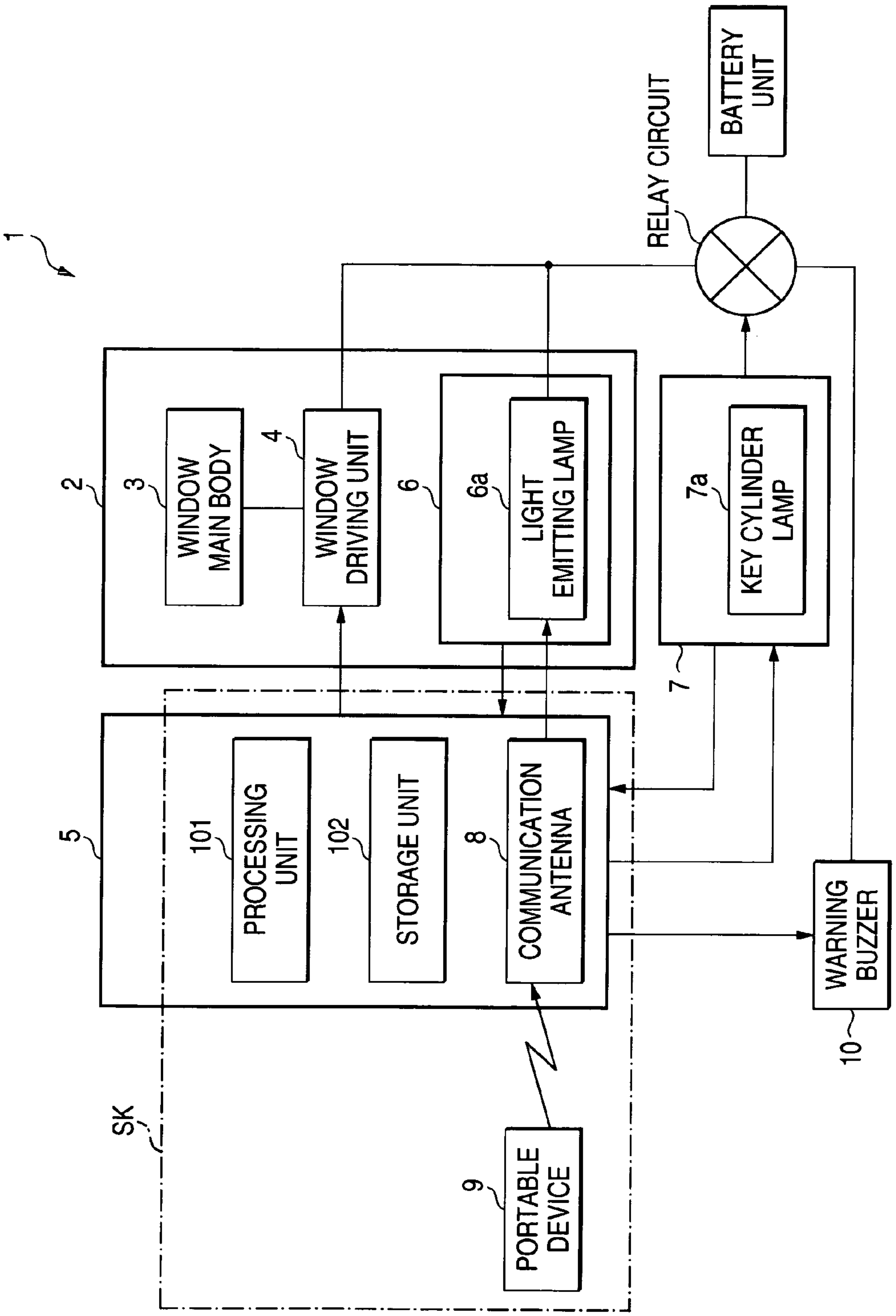
FIG. 1 is a block diagram schematically showing a configuration of a power window system according to an embodiment of the invention.
Figure 2:
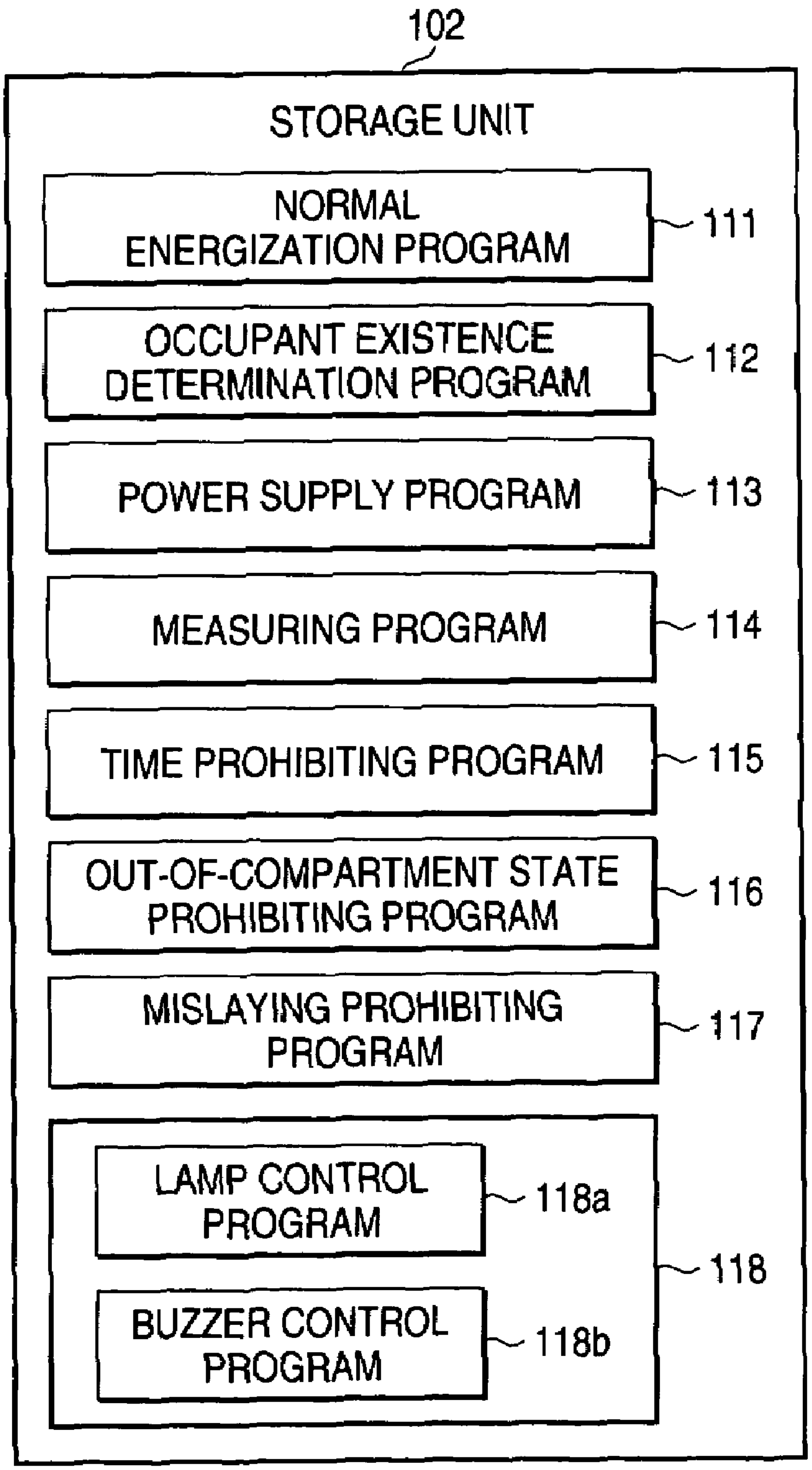
FIG. 2 is the block diagram schematically showing the configuration of a storage unit.
Figure 3:
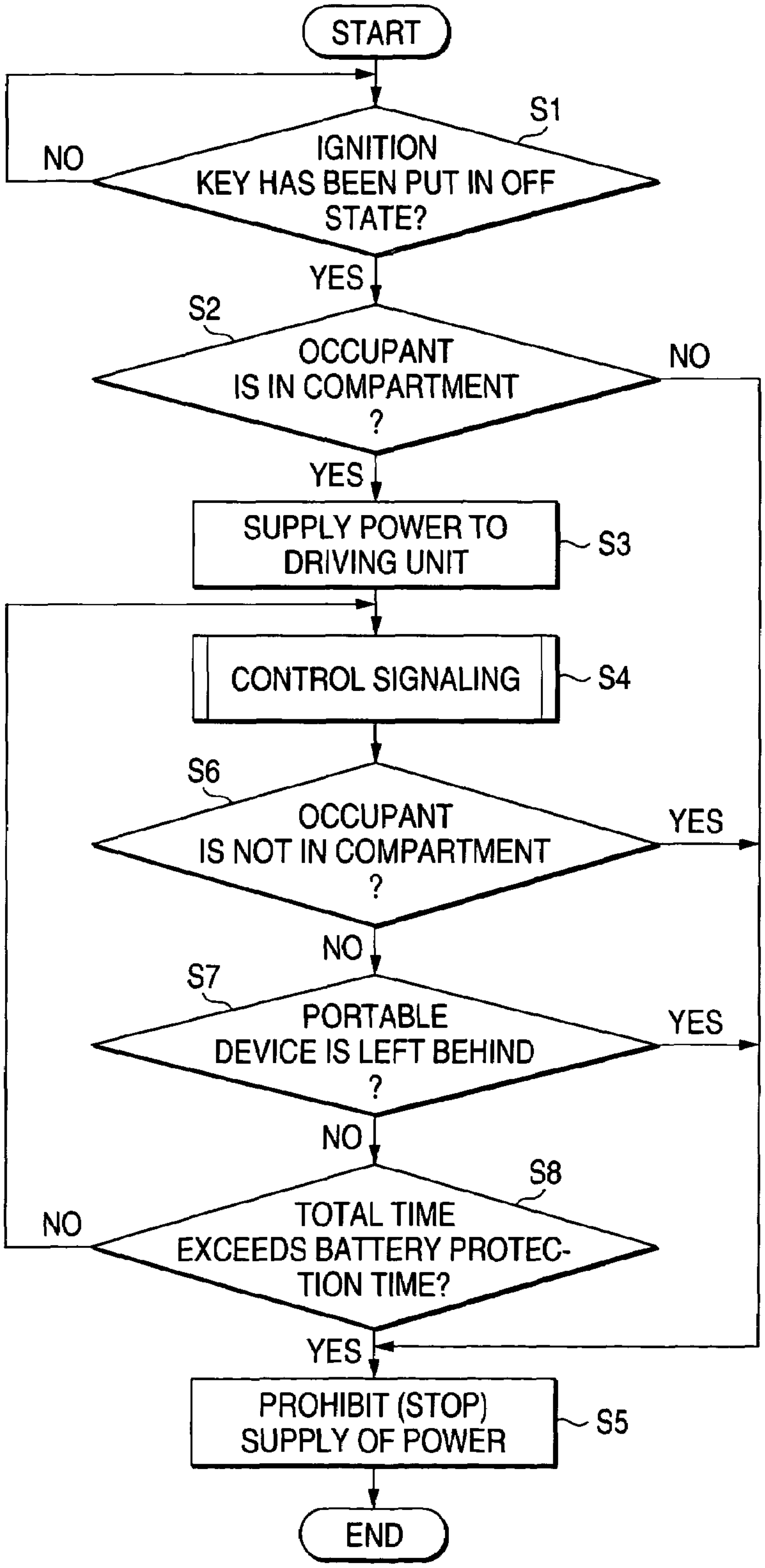
FIG. 3 is a flowchart illustrating an operation of an energization control unit.

FIGS. 1 to 3 show an embodiment of the present invention. FIG. 1 is a block diagram schematically showing a configuration of a power window system. FIG. 2 is the block diagram schematically showing the configuration of the storage unit. FIG. 3 is a flowchart showing an operation of an energization control unit.

As shown in FIG. 1, a power window system 1 includes a window main body 3 for opening and closing an opening in a vehicle door 2, a window driving unit 4 for raising and lowering the window main body 3, an energization control unit 5 for controlling the energization of the window driving unit 4 and a window operating unit 6 connected to the window driving unit 4 and installed in the vehicle door 2.

The window driving unit 4 has an electric motor and arms. The arm is connected to the electric motor and the main body 3. When the driving motor is activated, the window main body 3 is raised and lowered. Here, when a vehicle ignition key 7 is put in an ON state, a power is supplied from a battery to the window driving unit 4 via a relay circuit, whereby an window operation is permitted. In addition, when the ignition key 7 is in an OFF state, no power is supplied to the window driving unit 4 in principle.

In this embodiment, the energization control unit 5 is connected to the ignition key 7 and receives signals regarding the ON/OFF state of the ignition key 7. In addition, the energization control unit 5 has a communication antenna 8 for receiving a signal from a portable device 9 held by an occupant of a vehicle. Note that the portable device 9 and the communication antenna 8 are those used in a smart key system SK equipped on the vehicle.

The smart key system SK is designed to permit the start of an engine only when the occupant is in a passenger compartment and is configured similarly to a conventional one.

In addition, the portable device 9 has a mislaid warning function (as a mislaid warning mechanism) for alarming with an alarm that the portable device 9 is left in the passenger compartment when a predetermined mislaying condition is established. As the predetermined mislaying condition, for example, a detection may be made a condition of a state where vehicle doors are all locked irrespective of the fact that the portable device 9 is left in the passenger compartment.

In addition, the energization control unit 5 is connected to a light emitting lamp 6*a* for the window operating unit 6 and a key cylinder lamp 7*a* for the ignition key 7 so that the illumination or flashing of the respective lamps 6*a*, 7*a* can be controlled. Furthermore, the energization control unit 5 is connected to a warning buzzer 10 so that the activation of the warning buzzer 10 can be controlled. This warning buzzer 10 urges the occupant to turn off lamps or to lock the vehicle door 2.

As shown in FIG. 1, the energization control unit 5 has a processing unit 101 made up of, for example, a CPU and a storage unit 102 made up of, for example, a ROM, a RAM and the like. Note that in this embodiment, the processing unit 101 and the storage unit 102 are also used for the smart key system SK. As shown in FIG. 2, a normal enegization program 111 for controlling the energization of the window driving unit 4 based on the operating state of the window operating unit 6 is stored in the storage unit 102, whereby the main body 3 is raised and lowered as the occupant wishes in a state where the power is supplied to the window driving unit 4.

In addition, stored in the storage unit 102 are an occupant existence determination program 112 for determining whether the occupant is in the compartment where the occupant is within the passenger compartment or where the occupant is outside the passenger compartment and a power supply program 113 for supplying the power to the window driving unit 4 when the passenger is determined in the compartment. Namely, in the embodiment, the energization control unit 5 constitutes the occupant existence recognition means (as a determination unit) and the power supply unit.

In the embodiment, the occupant existence determination program 112 is such as to be used in the smart key system SK. In making a determination by the occupant existence determination program 112, a receiving condition of a signal from the portable device 9 such as the magnitude of the sensitivity of a signal, for example, maybe used as a reference. In addition, although not illustrated in particular, wiring of an electric system is configured such that the power is supplied only to parts involved in the operation of the window, when the power is supplied by the power supply program 113.

In addition, stored in the storage unit 102 is a measuring program 114 for measuring a total time when the window main body 3 has been driven after the occupant existence determination program 112 determines that the occupant is in the compartment when the ignition key 7 is in the OFF state. Namely, in the embodiment, the energization control unit 5 also constitutes the time measuring unit.

Furthermore, stored in the storage unit 102 is a time prohibiting program 115 for prohibiting the power supply to the driving unit 4 by the power supply program 113 when the total time so measured exceeds a pre-set battery protection or endurance time. Namely, in this embodiment, the energization control unit 5 also constitutes the time prohibiting unit.

In addition, stored in the storage unit 102 is an out-of-compartment state prohibiting program 116 for prohibiting the power supply to the driving unit 4 in the event that the occupant existence determination program 112 determines that the occupant is in the non-in-compartment state after the power has been supplied to the window driving unit 4 by the power supply program 113. Namely, in this embodiment, the energization control unit 5 also constitutes the non-in-compartment state prohibiting unit. In this embodiment, the power supply to the driving unit 4 is designed to be prohibited after the passage of a pre-set permissible period that is set in advance since the occupant existence determination program 112 has determined that the occupant is in the non-in-compartment state.

In addition, stored in the storage unit 102 is a mislaid prohibiting program 117 for prohibiting the power supply to the driving unit 4 after the mislaid warning function of the portable device 9 is activated in the state where the power is supplied to the driving unit 4 by the power supply program 113. Namely, in this embodiment, the energization control unit 5 also constitutes the mislaid prohibiting unit. In this embodiment, the power supply is designed to be prohibited after the passage of a predetermined time since the mislaid warning function of the portable device 9 has been activated.

In addition, stored in the storage unit 102 is a signaling program 118 for signaling the occupant that power is supplied to the window driving unit 4 by the power supply program 113 so that the window can be operated. In this embodiment, the signaling program 118 includes a lamp controlling program 118*a* for controlling the flashing of the key cylinder lamp 7*a* of the ignition key device 7 and the light emitting lamp 6*a* of the window operating unit 6 which are both disposed within the passenger compartment. In addition, the signaling program 118 includes a buzzer controlling program 118*b* for controlling the activation of the warning buzzer 10. Namely, in this embodiment, the energization control unit 5 also constitutes the signaling unit, the lamp controlling unit and the buzzer controlling unit.

The operation of the energization control unit 5 of the power window system 1 that is configured as described heretofore will be described by reference to a flowchart illustrated in FIG. 3. Note that a state where the ignition key 7 is turned to be in the ON state so as to supply the power to the window driving unit 4 is an initial state.

Firstly, it is determined whether or not the ignition key 7 has been switched from the ON state to the OFF state (step S1). At this time, if the ignition key 7 is determined to remain in the ON state, it returns to the step S1 for waiting.

If the ignition key 7 is determined to be switched to the OFF state in the step S1, it is determined whether or not the occupant is in the passenger compartment (step S2). In this embodiment, as described before, the determination is implemented by using the smart key system SK. That is, the determination is carried out based on the signal from a portable device 9. As this occurs, if the occupant is in the passenger compartment, the power is supplied to the window driving unit 4 (step S3). Then, the key cylinder lamp 7*a* of the ignition key 7 and the light emitting light 6*a* of the window operating unit 6 are controlled so as to be flashed, and the warning buzzer 10 is controlled to be activated (step S4). Note that if the occupant is not in the passenger compartment in the step S3, the power supply to the driving unit 4 is stopped (step S5).

Thereafter, it is determined whether or not the occupant is out the compartment (step S6), then proceed to the step 5, where the power supply to the window driving unit 4 is stopped. If the occupant is determined to continue to be in the compartment in the step S6, it is determined whether or not the mislaid function of the portable device 9 has been activated (step S7). If the mislaid function of the portable device 9 is determined to be in operation, then it proceeds to the step 5, where the power supply to the window driving unit 4 is stopped after the predetermined time elapse.

If it is determined in the step S7 that the mislaid function of the portable device 9 has not yet been activated, it is determined then whether or not the total time while the window main body 3 has been driven to exceed the battery protection time (step S8). If the total time exceeds the battery protection time, the power supply to the window driving unit 4 is stopped, and the control is terminated (step S8). If the total time does not exceed the battery protection time, then return to the step S4, where the power supply to the window driving unit 4 and the signaling control by the respective lamps 6*a*, 7*a* and the warning buzzer 10 are made to continue.

Thus, according to the power window system 1 of the embodiment, even when the ignition key 7 is in the OFF state, in case the occupant existence determination program 112 determines that the occupant is in the compartment, the power is supplied to the window driving unit 4 by the power supply program 113. Here, since the occupant existence determination program 112 determines whether or not the occupant is within the passenger compartment by receiving a signal from the portable device 9, the determination can be implemented accurately.

Consequently, the energization of the window driving unit 4 can be implemented only when the existence of the occupant in the passenger compartment can be ensured by ensuring the accurate determination of the existence of the occupant, thereby making it possible to suppress the exhaustion of the battery to a minimum level.

In addition, according to the power window system 1 of the embodiment, the system can be configured without increasing the number of components by using the smart key system SK which is equipped on the vehicle as the portable device 9 and the occupant existence determination program 112. In addition, since the engine cannot be started as long as the signal from the portable device 9 of the smart key system SK is not received, the occupant is forced to hold the portable device 9. Namely, since the system is operated on the basis of a signal from the portable device 9 which is held by the occupant at all times, the determination of the existence of the occupant can be more accurate.

Additionally, according to the power window system 1 of the embodiment, the power supply to the window driving unit 4 is prohibited in the state in which the occupant moves to the outside of the passenger compartment with the portable device 9 being left behind in the passenger compartment, whereby the battery exhaustion can be suppressed further.

Here, since nobody is within the passenger compartment in the state where the portable device 9 is left within the passenger compartment, the robbery by a robber cannot be monitored. In this case, when the window driving unit 4 is in the energized state, the robber can operate to switch on the window operating unit 6 so as to lower the window main body 3 by inserting the stick in the opened space of the vehicle.

However, the robbery can be prevented by prohibiting the power supply to the window driving unit 4 after the activation of the mislaid function of the portable device 9.

In addition, according to the power window system 1 of the embodiment, when the total time when the window main body 3 has been driven after the ignition key 7 was put in the OFF state exceeds the battery protection time, the power supply to the window driving unit 4 is prohibited, whereby the risk is eliminated that power is supplied to the window driving unit 4 over a long period of time to thereby exhaust the battery, thereby making it possible to protect the battery properly.

Additionally, according to the power window system 1 of the embodiment, the power supply to the window driving unit 4 is prohibited in the event that the passenger compartment is determined to be not in the compartment due to the fact that the occupant has moved to the outside of the passenger compartment in the state where power is supplied to the power window driving unit 4 when the ignition key 7 is in the OFF state, whereby the battery exhaustion can be suppressed further.

Here, as has been described before, while the window main body 3 can be operated to be lowered in the state when the ignition key 7 is in the OFF state, the robbery can be prevented by prohibiting the power supply to the window driving unit 4 when the occupant moves out of the passenger compartment.

Here, in the embodiment, since the power supply to the window driving unit 4 is prohibited after the pre-set permissible period of time after the occupant is not in the compartment, even when the occupant moves out of the vehicle for a very short time, in case the occupant returns to the passenger compartment before the pre-set permissible period of time has elapsed, the window can continued to be operated, whereby the convenience to the occupant can be enhanced further.

In addition, according to the power window system 1 of the embodiment, the occupant can recognize that the window is operable even when the ignition key 7 is in the OFF state. In this embodiment, it is possible to recognize by the flashing lamps 6*a*, 7*a* which are disposed within the passenger compartment and the activated warning buzzer 10 which is also disposed within the passenger compartment that the window can be operated.

Consequently, the window can be operated quickly without switching the ignition key 7 from the OFF state to the ON state when the occupant recognizes that the window can be operated. In addition, since the key cylinder lamp 7*a* of the key operating unit and the lamp 6*a* of the window operating unit, which are both disposed within the passenger compartment, and the warning buzzer 10 for gear shift operation, which is also disposed within the passenger compartment, are used, the signaling unit can be configured without increasing the number of components.

Note that while the smart key system SK equipped on the vehicle is used as the portable device 9 and the occupant existence determination program 112 in this embodiment, it goes without saying that the device and the program may be provided separately from the smart key system SK. In addition, the portable device 9 may be such as not to have the mislaid warning function.

Figure 4:
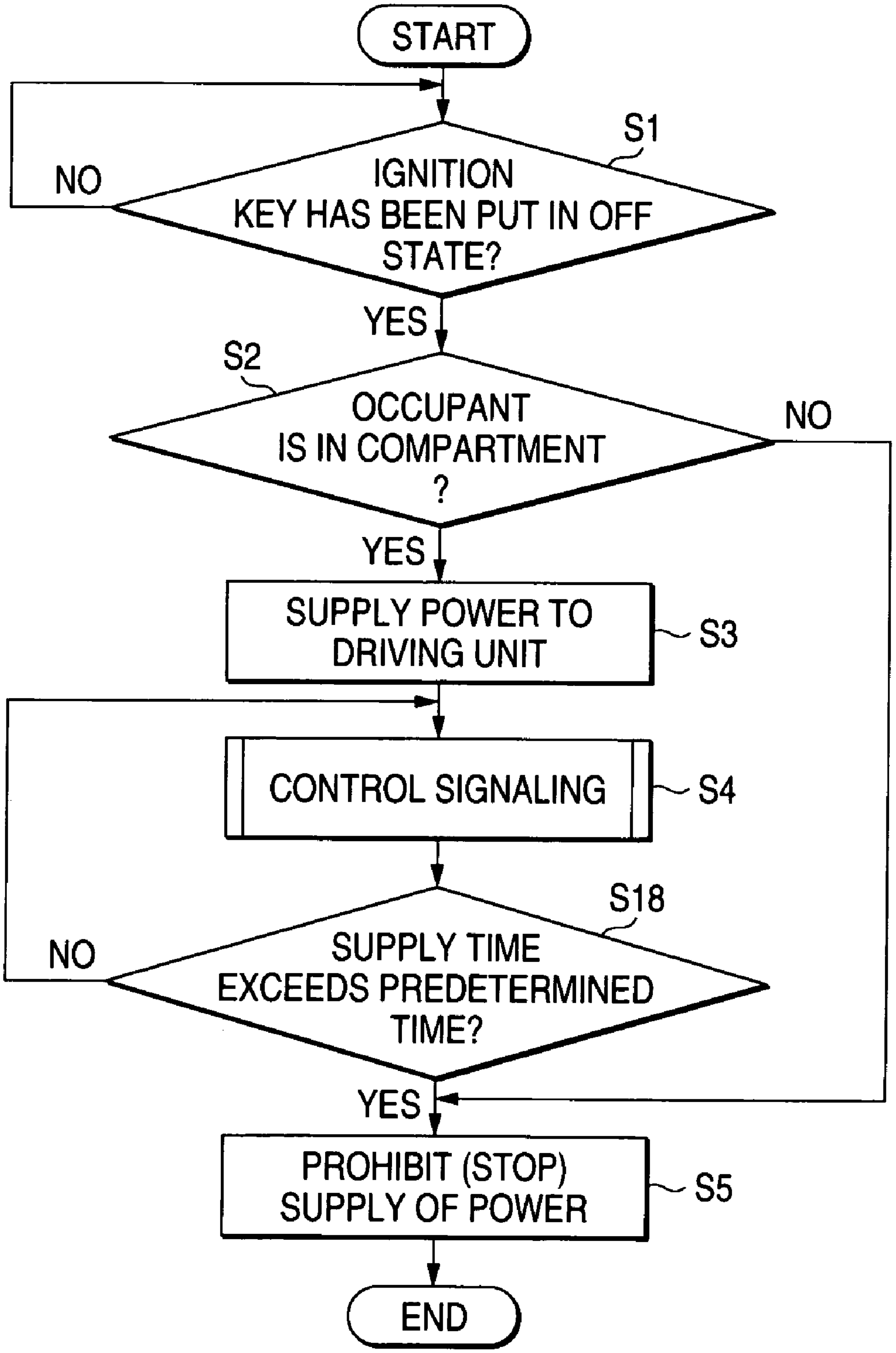
FIG. 4 is a drawing showing a modified example of the energization control unit, which is a flowchart illustrating the operation of the energization control unit.
Figure 5:
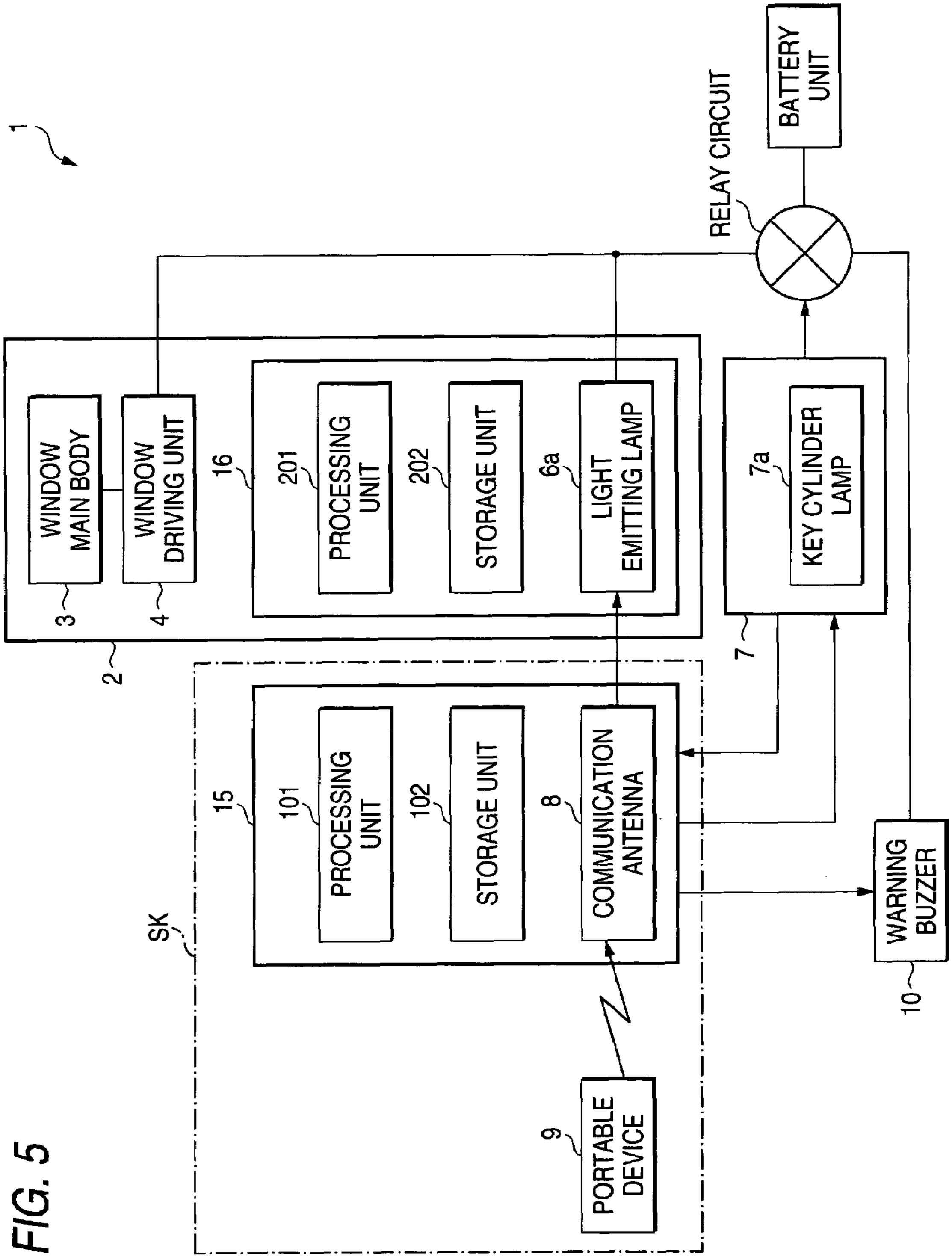
FIG. 5 is the drawing showing the modified example of the power window system, which is a block diagram schematically showing the configuration of the power window system.
Figure 6A:
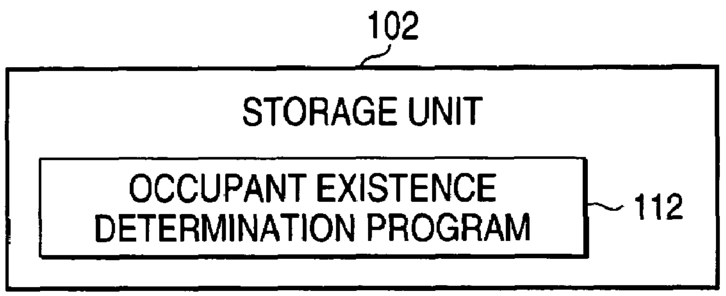
Figure 6B:
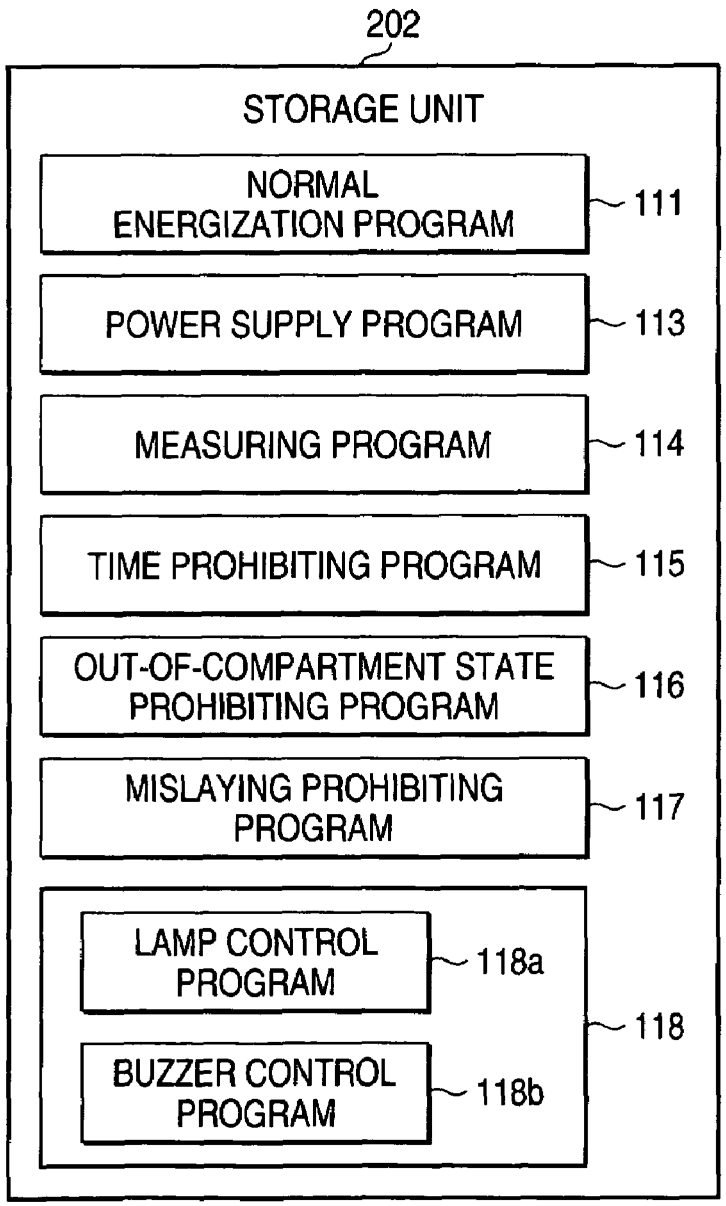

In addition, for example, as shown in FIG. 5, a window control unit 16 may be provided which has an processing unit 201 made up of a CPU and a storage unit 202 made up of, for example, an EEPROM, RAM and the like. In this case, as shown in FIG. 6B, stored in the storage unit 202 are a normal energization program 111, a power supply program 113, a measuring program 114, a time prohibiting program 115, a out-of-compartment state prohibiting program 116, a mislaid prohibiting program 117 and a signaling program 118. Namely, the window control unit 16 constitutes the power supply unit, the measuring unit, the time prohibiting unit, the non-in-compartment state prohibiting unit, the mislaid prohibiting unit and the signaling unit. In addition, as shown in FIG. 5, a smart control unit 15 of the smart key system SK has an processing unit 101 and a storage unit 102 as in the case with the energization control unit 5 in the aforesaid embodiment. As shown in FIG. 6A, the occupant existence determination program 112 is stored in the storage unit 102, and the smart control unit 15 constitutes the occupant existence determination unit. Even when this configuration is adopted, the operation of the control system becomes similar to the flowcharts shown in FIGS. 3 and 4, and similar function and advantage to those provided by the aforesaid embodiment can be obtained.

In addition, while, in the embodiment, the occupant is signaled that the window can be operated using both the lamps which are disposed within the passenger compartment and the buzzer which is also disposed within the passenger compartment in the aforesaid embodiment, the signaling may be implemented only by any one of the above mentioned systems. Note that no signaling regarding the operation of the window may be provided to the occupant.

Additionally, while, in the embodiment, the power supply to the window driving unit 4 is described as being prohibited in the event that the total time when the window main body 3 has been driven after the power was supplied to the window driving unit 4 with the ignition key 7 being put in the OFF state, the occupant moves out of the passenger compartment with the portable device 9 being left behind in the passenger compartment, or the occupant moves out of the passenger compartment, as shown by the flowchart shown in FIG. 4, none of these prohibiting units may be provided. In the flowchart shown in FIG. 4, the power supply is designed to be stopped when the predetermined time has elapsed since the power was started to be supplied to the window driving unit 4 with the ignition key 7 being put in the OFF state (step S18).

In addition, while, in the embodiment, the power supply is described as being prohibited after the pre-set permissible time period since the occupant was not in compartment, the power supply may be prohibited immediately after the occupant is not in the compartment, or it goes without saying that the configuration may be modified appropriately including the configurations of other specific detailed portions.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A power window system comprising:

a determination unit for determining whether an occupant of a vehicle is in a passenger compartment or outside the passenger compartment by receiving a signal from a portable device held by the occupant; and a power supply unit for supplying a power to a window driving unit when the determination unit determines that the occupant is in the compartment and when a vehicle ignition key is in an OFF state.

2. The power window system according to claim 1, wherein the portable device and the determination unit are used in a smart key system for permitting a start of an engine when the occupant is in the passenger compartment.

3. The power window system according to claim 1, further comprising:

a mislaid warning mechanism for alarming that the portable device is left in the passenger compartment when a predetermined mislaying condition is established, and a mislaid prohibiting unit for prohibiting a power supply to the window driving unit after the mislaid warning mechanism is activated.

4. The power window system according to claim 1, further comprising:

a measuring unit for measuring a total time when a window is operated after the determination unit determines that the occupant is in the compartment; and a time prohibiting unit for prohibiting a power supply to the window driving unit when the total time measured by the measuring unit exceeds a pre-set battery protection time.

5. The power window system according to claim 1, further comprising a prohibiting unit for prohibiting a power supply to the window driving unit when the determination unit determines that the occupant is not in the compartment after the power supply unit supplies to the window driving unit.

6. The power window system according to claim 5, wherein the prohibiting unit prohibits the power supply to the window driving unit after a pre-set permissible time period elapse.

7. The power window system according to claim 1, further comprising a signaling unit for signaling the occupant that the power is supplied to the window driving unit.

8. The power window system according to claim 7, wherein the signaling unit comprises a lamp control unit for controlling a lamp disposed within the passenger compartment and signaling the occupant that the window can be operated.

9. The power window according to claim 7, wherein the signaling unit comprises a buzzer control unit for controlling a buzzer disposed within the passenger compartment and signaling the occupant that the window can be operated.

* * * * *